Sept. 8, 1936.  J. MANTELET  2,054,038

MASHER

Filed March 23, 1935

Inventor: Jean MANTELET
by C.A. Snow & Co.
Attorneys.

Patented Sept. 8, 1936

2,054,038

UNITED STATES PATENT OFFICE 2,054,038

MASHER

Jean Mantelet, Bagnolet, France, assignor to Mantelet & Boucher (Societe en nom collectif), Bagnolet (Seine), France Application March 23, 1935, Serial No. 12,711
In Luxemburg May 17, 1934

3 Claims. (Cl. 146—175)

The present invention relates to mashers.

There exist mashers comprising a vessel, or colander, the perforated bottom of which is in the form of a surface of revolution, and in which the squeezing of the matter to be treated is obtained by rotating, about the axis of said surface, a member the under surface of which is of helical shape and the lower edge of which is so shaped as to slide along said perforated bottom when said member is thus rotated. The matter in said vessel is caught between the upper edge of said member and the perforated bottom and progressively squeezed as said member is being rotated, said matter being finally forced through the perforations of the bottom of the vessel by the lower edge of said member, which scrapes said bottom.

However, when the matter to be treated in this apparatus possesses a certain homogeneity (for instance in the case of meat or of fibrous vegetables, such as cabbages, wart, or the like) the action of the helical under surface of said member is not sufficient for quickly disintegrating said matter and the straining thereof is difficult or may require a good deal of time.

The object of the present invention is to obviate this drawback.

For this purpose, scraping means, such for instance as knives or blades, rigidly carried by a fixed part of the apparatus, for instance the lateral wall of the vessel, and the edges of which are located opposite the lateral edge of said member, are so arranged as to scrape and disintegrate the matter treated in the apparatus, when said matter is being acted upon by the revolving member.

Preferred embodiments of the present invention will be hereinafter described, with reference to the accompanying drawing, given merely by way of example, and in which.

Figure 1:
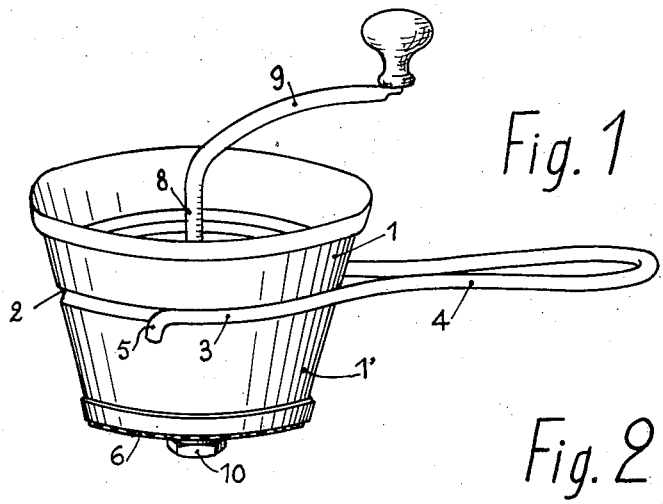
Fig. 1 is a perspective view of a masher according to the present invention.

The apparatus according to the present invention includes a vessel having a lateral wall 1, of conical shape in the embodiment shown in the drawing, and the lower part 1' is of restricted section. Under the portion 2 that joins together the conical elements 1 and 1' are engaged, and fixed for instance by soldering, the branches 3 of a fork-shaped member made of metal wire and the part 4 of which constitutes the handle of the apparatus. The ends 5 of this member are bent in a downward direction so as to form kind of hooks intended to support the apparatus on the vessel that is to receive the mash having passes through the perforated bottom 6 of the apparatus.

This perforated bottom 6 is provided with a hub 7, located at the center of said bottom, and in which is mounted a spindle 8 provided, at its upper end, with a crank 9 for operating the apparatus. On this spindle, which is kept in position, at its lower end, by a nut 10 screwed thereon, is keyed a helical-shaped member 11 that serves to squeeze the matter between its under surface and the perforated bottom 6. The lower edge 12 of this squeezing member 11 is so shaped as to remain constantly in contact with the perforated bottom 6, along which it slides, when member 11 is rotated. The surface of element 11 is at a distance from the perforated bottom 6 which increases from said lower edge 12 to the opposite edge 13. In the embodiment shown by the drawing, the lower end of the peripheral edge 14 of helical member 11 is substantially in contact with the lateral wall 1' of the apparatus and the distance between said peripheral edge 14 and said lateral wall 1' increases gradually from the lower end of said edge 14 up to the upper end thereof, so as to leave between edge 14 and wall 1' a space sufficient for permitting the matter to escape therethrough.

Several scraping blades, three for instance, are fixed, for instance by soldering, on the wall 1' of the apparatus. These blades are of angular section, including a portion 15 serving to the fixation of the blade to part 1' and a portion 16 projecting from surface 1' and which constitutes the scraper proper. The edges of these scrapers are disposed opposite the peripheral edge 14 of the helical squeezing member 11. These scrapers are inclined with respect to the generatrices of wall 1', on which they are fixed, downwardly in the direction of the rotation of member 11. The lower ends of these scrapers are at a certain distance from bottom 6, so as to leave an interval 17 through which the lower peripheral portion of squeezing member 11 can pass.

Figure 2:
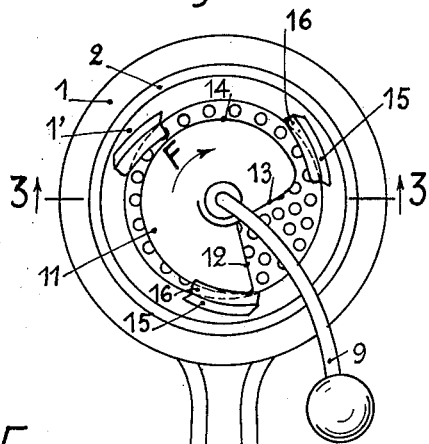
Fig. 2 is a plan view of the apparatus shown by Fig. 1.
Figure 3:
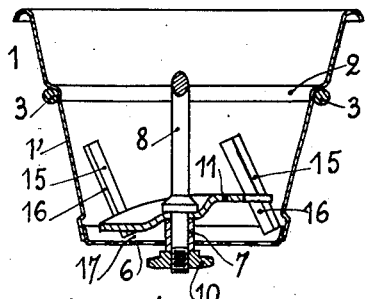
Fig. 3 is a sectional view on the line 3—3 of Fig. 2.
Figure 4:
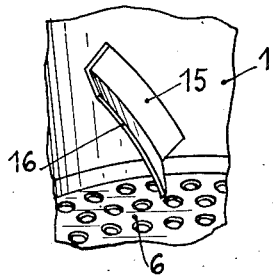
Fig. 4 is a partial view showing a scraping blade in perspective.

When the matter to be mashed is driven along by member 11 in the direction of arrow F (Fig. 2) the peripheral portion of said matter is caused to rub against the edges of scrapers 16, which disintegrate it and facilitate the subsequent passage of said matter through the perforations of bottom 6. Furthermore, owing to their inclination, these scrapers constantly bring back toward the perforated bottom of the apparatus the portion of the matter that would tend to escape through the interval between lateral wall 1' and the peripheral edge of the rotary squeezing member 11. These movements imposed to the matter to be treated produce a very useful stirring of said matter.

Of course, the shape of the walls 1, 1' of the apparatus are not necessarily of the shape shown by way of example by the drawing. The perforated bottom acting as a strainer may also be given any desired shape provided, of course, that said bottom and the lower edge of said squeezing member are made of corresponding shapes so that, during the rotation of said member, said lower edge thereof is constantly in contact with bottom 6.

Figure 5:
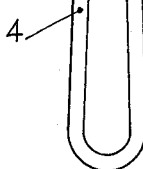
Fig. 5 is a partial view showing a scraping blade having a serrate edge.

As for the scrapers 16, their edge may be indented, as shown in Fig. 5, so as to improve the disintegrating action on the matter.

Finally, a spring may be interposed between hub 7 and nut 10.

In a general manner, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A masher which comprises, in combination, a vessel having a perforated bottom acting as a strainer, a squeezing member pivoted in said vessel about an axis passing through the center of said bottom, the under surface of said member being of helical shape about said axis and its lower edge being so shaped as to slide in contact with said bottom when said member is rotated about said axis and to extend close to the lateral wall of said vessel, means for rotating said member about said axis, and at least one blade rigidly carried by said lateral wall so as to lie between said wall and a portion of the peripheral edge of said squeezing member during the rotation thereof, the lower end of said blade being at a sufficient distance from said bottom for leaving a passage for the lower peripheral portion of said squeezing member between said blade and said bottom, said blade being inclined, with respect to a plane passing through said axis and intersecting said blade, downwardly in the direction of revolution of said squeezing member.

2. A masher according to claim 1 including a plurality of such blades distributed along the periphery of said vessel, about said axis.

3. A masher according to claim 1 in which the edge of said blade adjacent to said squeezing member is indented.

JEAN MANTELET.